United States Patent [19]

Yamada et al.

[11] Patent Number: 5,073,523
[45] Date of Patent: Dec. 17, 1991

[54] DIELECTRIC CERAMIC COMPOSITION

[75] Inventors: Masayuki Yamada, Takefu; Hiroaki Ichikawa, Yokohama; Tadashi Morimoto, Takefu; Yasuyuki Naito, both of Takefu; Hiroshi Takagi, Otsu; Harufumi Mandai, Takatsuki; Yukio Sakabe, Kyoto, all of Japan

[73] Assignee: Murata Mfg. Co., Japan

[21] Appl. No.: 578,629

[22] Filed: Sep. 6, 1990

[30] Foreign Application Priority Data

Sep. 7, 1989 [JP] Japan ................................ 1-234388

[51] Int. Cl.⁵ ...................... C03C 14/00; C04B 35/49
[52] U.S. Cl. ........................................ 501/32; 501/136
[58] Field of Search ................................. 501/32, 136

[56] References Cited

U.S. PATENT DOCUMENTS

| 3,869,398 | 3/1975 | Yamaoka et al. | 501/136 |
| 4,485,181 | 11/1984 | Sakabe | 501/136 |
| 4,746,639 | 5/1988 | Sano et al. | 501/136 |
| 4,820,670 | 4/1989 | Sano et al. | 501/136 |

Primary Examiner—Mark L. Bell
Attorney, Agent, or Firm—Ostrolenk, Faber, Gerb & Soffen

[57] ABSTRACT

A dielectric ceramic composition consists essentially of 80 to 99.7 wt % of a main component of a system, $SrTiO_3$-$PbTiO_3$-$CaTiO_3$-$Bi_2O_3$-$TiO_2$-$SnO_2$, at least one oxide of rare earth elements incorporated therein as an additive in an amount of 0.1 to 5.0 wt % in terms of $Re_2O_3$ (where Re is at least one rare element selected from the group consisting of Nd, La, Ce, Pr and Sm), and 0.2 to 15 wt % of a vitreous component. The main component consists essentially of 20.0 to 50.0 wt % of $SrTiO_3$, 8.0 to 37.6 wt % of $PbTiO_3$, 3.2 to 33.9 wt % of $CaTiO_3$, 4.4 to 35.2 wt % of $Bi_2O_3$, 2.5 to 13.6 wt % of $TiO_2$ and 0.2 to 12.0 wt % of $SnO_2$. The vitreous component consists essentially of 10 to 45 mol % of $Li_2O$, 5 to 40 mol % of at least one oxide selected from the group consisting of BaO, MgO, CaO and SrO, 0.2 to 10 mol % of $Al_2O_3$, 30 to 70 mol % of at least two oxide selected from the group consisting of $SiO_2$, $MnO_2$ and $TiO_2$, the content of $SiO_2$ in the vitreous component being not less than 15 mol % at least, and 1 to 35 mol % of CuO.

1 Claim, No Drawings

1

DIELECTRIC CERAMIC COMPOSITION

BACKGROUND OF THE INVENTION

1. Field of the invention

The present invention relates to a dielectric ceramic composition and, more particularly, a high permittivity dielectric ceramic composition.

2. Description of the prior art

As a high permittivity dielectric ceramic material for capacitors, there have widely been used dielectric ceramic compositions of a system $BaTiO_3$. Other dielectric materials presently used are compositions of a system, $SrTiO_3$-$PbTiO_3$-$Bi_2O_3TiO_2$ or $SrTiO_3$-$PbTiO_3$-$Bi_2O_3$-$TiO_2$-$CaTiO_3$. Such compositions are disclosed in Japanese patent lay-open No. 52-41880 or U.S. Pat. No. 3869398.

However, the composition of the $BaTiO_3$ system gives a high distortion factor when applied to ceramic capacitors. For example, the composition gives values for third harmonic distortion of $-50$ to $-75$ dB when it is applied with a voltage of 10 to 50 Vrms/mm.

On the other hand, the composition of the system $SrTiO_3$-$PbTiO_3$-$Bi_2O_3$-$TiO_2$ or $SrTiO_3$-$PbTiO_3$-$Bi_2O_3$-$TiO_2$-$CaTiO_3$ makes it possible to produce capacitors with a value of third harmonic distortion smaller than that of the $BaTiO_3$ compositions. However, such a composition has a large dependency of distortion factor on AC voltage, as compared with other capacitors such as film capacitors and aluminum electrolyte capacitors. In addition, when such a composition is applied to multilayer-layer ceramic capacitors, it is required to use noble metals such as platinum as a material for internal electrodes because of high sintering temperature of the composition of 1300° to 1350° C. The use of noble metals results in increase of the manufacturing cost of capacitors.

SUMMARY OF THE INVENTION

It is therefore an object of the present invention to provide a dielectric ceramic composition having a low distortion factor and a relatively low sintering temperature of not more than 1200° C., in addition to a high dielectric constant of not less than 500, a small dielectric loss factor of not more than 0.5% at 1 KHz, and a small change rate of capacitance on temperature.

These and other objects of the present invention are achieved by providing a dielectric ceramic composition consisting essentially of 80 to 99.7 wt % of a main component of a system $SrTiO_3$-$PbTiO_3$-$CaTiO_3$-$Bi_2O_3$-$TiO_2$-$SnO_2$, 0.1 to 5.0 wt % of at least one oxide of rare earth elements in terms of $Re_2O_3$, where Re is at least one rare earth element selected from the group consisting of Nd, La, Ce, Pr and Sm, and 0.2 to 15 wt % of a vitreous component, said main component consisting essentially, by weight, of 20.0 to 50.0 % of $SrTiO_3$, 8.0 to 37.6% of $PbTiO_3$, 3.2 to 33.9% of $CaTiO_3$, 4.4 to 35.2% of $Bi_2O_3$, 2.5 to 13.6% of $TiO_2$, and 0.2 to 12.0% of $SnO_2$, said vitreous component consisting essentially of 10 to 45 mol % of $Li_2O$, 5 to 40 mol % of at least one oxide selected from the group consisting of BaO, MgO, CaO and SrO, 0.2 to 10 mol % of $Al_2O_3$, 30 to 70 mol % of at least two oxides selected from the group consisting of $SiO_2$, $MnO_2$ and $TiO_2$, and 1 to 35 mol % of CuO, the content of $SiO_2$ in the vitreous component being not less than 15 mol % at the least.

The composition of the present invention has been limited to those consisting essentially of 80 to 99.7 wt % of the main component of a system $SrTiO_3$-$PbTiO_3$-$CaTiO_3$-$Bi_2O_3$-$TiO_2$-$SnO_2$, 0.1 to 5.0 wt % of at least one oxide of rare earth elements in terms of $Re_2O_3$, where Re is at least one rare earth element selected from the group consisting of Nd, La, Ce, Pr and Sm, and 0.2 to 15 wt % of the vitreous component for the following reasons: If the content of rare element oxide ($Re_2O_3$) is less than 0.1 wt %, the dielectric loss factor becomes larger than 0.5%. If the content of rare earth element oxide exceeds 5.0 wt %, the relative dielectric constant becomes less than 500. The incorporation of vitreous component provides lowering of the sintering temperature of the ceramic. However, if its content is less than 0.2 wt %, the sintering temperature becomes higher than 1200 ° C. If the content of vitreous component exceeds 15.0 wt %, the ceramic is made into porous and the dielectric constant becomes less than 500.

The dielectric ceramic composition of the present invention has a high dielectric constant of not less than 500, a dielectric loss factor of not more than 0.5% at 1 KHz, a low distortion factor and a small change rate of capacitance on temperature. In addition, it can be filed at a relatively lower temperature of not more than 1200° C. as compared with the dielectric ceramic composition of the prior art.

The above and other objects, features and advantages of the present invention will become apparent from the following description in connection with several examples.

EXAMPLE 1

There were used $SrCO_3$, $Pb_3O_4$, $CaCO_3$, $Bi_2O_3$, $TiO_2$, $SnO_2$, $Nd_2O_3$, $Sm_2O_3$, $La_2O_3$, $CeO_2$ and $Pr_6O_{11}$ as raw materials for a basic composition composed of the main component and at least one oxide of rare earth elements. These raw materials were weighed, mixed in proportions shown in Table 1, and milled by the wet process for 16 hours in a polyethylene pot with alumina balls. After dehydration and drying, the mixture was placed in a zirconia saggar, calcined at 950° C. for 2 hours, crushed and then ground to prepare calcined powder.

Separate from the above, using $Li_2Co_3$, $BaCO_3$, MgO, $CaCO_3$, $SrCO_3$, $SiO_2$, $MnO_2$, $TiO_2$, CuO and $Al_2O_3$ as raw materials, there were prepared vitreous compositions in the following manner: The raw materials were weighed, mixed each other in proportions shown in Table 2, and milled with a ball mill by the wet process for 16 hours and then dried by evaporation. The resultant mixed powder was put into an alumina crucible, maintained at 1300° C. for 1 hour, vitrified by rapid cooling, and then ground to prepare powder of the vitreous composition having such particle size that particles may pass through a 200 mesh sieve screen.

The above calcined powder was added with the glass composition of Table 2 in proportions shown in Table 1, and then mixed together with a suitable amount of an organic binder by the wet-process in a polyethylene pot for 16 hours. The resultant mixture was dried by evaporation, granulated, and then compacted into disks with a diameter of 10 mm and a thickness of 1.2 mm. The thus prepared green ceramic disks were fired at various temperatures ranging from 940° to 1240° C. for 2 hours to produce ceramic disks.

For each composition, some of the ceramic disks were immersed in a fuchsin solution to determine the optimum firing temperature for each composition. The optimum firing temperature for each specimen is shown in Table 3.

The ceramic disks prepared by firing at the optimum firing temperature were provided on its opposite sides with silver electrodes by applying silver paste and then baking it at 800° C. to prepare specimens for measurements of electrical properties.

For each composition, measurements were made on relative dielectric constant ($\epsilon$) at 20° C., 1 KHz and 1 Vrms, dielectric loss factor (tan $\delta$) at 20° C., 1 KHz and 1 Vrms, distortion factor, and temperature characteristics of capacitance (TCR of C) over the temperature range of $-25°$ C. to $+85°$ C. relative to the capacitance at 20° C. Results are shown in Table 3.

In Table 3, the distortion factor is given by the third harmonic distortion measured by applying a radio frequency voltage (10 KHz) of 100 Vrms/mm or 200 Vrms/mm to the specimen.

In Tables 1 to 3, the specimen with an asterisk (*) are those out of the scope of the present invention, whereas other specimens are those falling within the scope of the present invention.

TABLE 1

| | Composition (wt %) | | | | | | | | | |
|---|---|---|---|---|---|---|---|---|---|---|
| | Main component (wt %) | | | | | | | Additive | | Vitreous component |
| | composition (wt %) | | | | | | | | | Compo- |
| No | SrTiO₃ | PbTiO₃ | CaTiO₃ | Bi₂O₃ | TiO₂ | SnO₂ | | Re₂O₃ | | sition |
| 1 | 34.7 | 21.6 | 5.2 | 25.4 | 8.3 | 4.8 | 97.0 | Re = Nd | 1.0 | A | 2.0 |
| 2 | 37.2 | 15.2 | 12.3 | 19.6 | 6.4 | 9.3 | 96.0 | Re = La | 2.0 | B | 2.0 |
| 3 | 41.2 | 16.5 | 18.2 | 10.2 | 12.4 | 1.5 | 95.0 | Re = Ce | 3.0 | C | 2.0 |
| 4 | 38.1 | 14.9 | 14.0 | 21.1 | 7.4 | 4.5 | 97.0 | Re = Pr | 1.0 | A | 2.0 |
| 5 | 35.0 | 18.9 | 16.5 | 16.5 | 6.0 | 7.1 | 95.5 | Re = Sm | 2.5 | B | 2.0 |
| 6* | 18.2 | 35.2 | 18.3 | 15.2 | 6.8 | 6.3 | 97.0 | Re = Nd | 1.0 | A | 2.0 |
| 7* | 53.1 | 8.2 | 10.5 | 17.0 | 8.4 | 2.8 | 93.0 | Re = La | 3.0 | A | 4.0 |
| 8* | 47.3 | 5.8 | 5.2 | 25.6 | 9.8 | 6.3 | 91.0 | Re = Sm | 2.0 | A | 7.0 |
| 9* | 24.0 | 40.3 | 8.2 | 12.4 | 8.4 | 6.7 | 89.5 | Re = Nd | 0.5 | A | 10.0 |
| 10* | 25.2 | 25.2 | 3.0 | 32.4 | 8.2 | 6.0 | 95.0 | Re = Ce | 1.0 | A | 4.0 |
| 11* | 24.5 | 12.5 | 35.0 | 13.7 | 12.3 | 2.0 | 89.0 | Re = Pr | 4.0 | A | 7.0 |
| 12* | 48.3 | 25.4 | 10.3 | 3.5 | 10.5 | 2.0 | 95.5 | Re = Sm | 2.5 | B | 2.0 |
| 13* | 23.0 | 13.2 | 9.4 | 38.0 | 11.8 | 4.6 | 81.0 | Re = Nd | 4.0 | B | 15.0 |
| 14* | 43.4 | 17.2 | 15.3 | 20.2 | 1.5 | 2.2 | 87.0 | Re = Pr | 3.0 | C | 10.0 |
| 15* | 23.1 | 22.0 | 6.2 | 30.4 | 15.2 | 3.1 | 89.5 | Re = La | 0.5 | C | 10.0 |
| 16* | 22.0 | 33.3 | 8.4 | 25.1 | 11.2 | 0 | 97.0 | Re = Nd | 1.0 | C | 2.0 |
| 17* | 29.9 | 13.5 | 6.5 | 22.1 | 13.0 | 15.0 | 96.0 | Re = Sm | 2.0 | C | 2.0 |
| 18* | 22.4 | 33.2 | 6.6 | 27.3 | 10.1 | 0.4 | 98.0 | — | 0 | B | 2.0 |
| 19* | 43.2 | 9.3 | 16.6 | 17.2 | 7.3 | 6.4 | 90.0 | Re = La | 8.0 | B | 2.0 |
| 20* | 34.7 | 21.6 | 5.2 | 25.4 | 8.3 | 4.8 | 99.0 | Re = Ce | 1.0 | — | 0 |
| 21* | 37.2 | 15.2 | 12.3 | 19.6 | 6.4 | 9.3 | 80.0 | Re = Nd | 3.0 | B | 17.0 |
| 22* | 41.2 | 16.5 | 18.2 | 10.2 | 12.4 | 1.5 | 93.0 | Re = La | 2.0 | D | 5.0 |
| 23* | 41.2 | 16.5 | 18.2 | 10.2 | 12.4 | 1.5 | 90.0 | Re = Sm | 5.0 | E | 5.0 |
| 24* | 41.2 | 16.5 | 18.2 | 10.2 | 12.4 | 1.5 | 94.0 | Re = Pr | 1.0 | F | 5.0 |
| 25* | 41.2 | 16.5 | 18.2 | 10.2 | 12.4 | 1.5 | 94.5 | Re = Ce | 0.5 | G | 5.0 |
| 26* | 41.2 | 16.5 | 18.2 | 10.2 | 12.4 | 1.5 | 94.5 | Re = Nd | 0.5 | H | 5.0 |
| 27* | 41.2 | 16.5 | 18.2 | 10.2 | 12.4 | 1.5 | 93.0 | Re = La | 2.0 | I | 5.0 |
| 28* | 41.2 | 16.5 | 18.2 | 10.2 | 12.4 | 1.5 | 94.5 | Re = Sm | 1.0 | J | 5.0 |
| 29* | 35.2 | 24.4 | 5.7 | 28.2 | 4.2 | 2.3 | 92.0 | Re = Ce | 3.0 | K | 5.0 |
| 30* | 35.2 | 24.4 | 5.7 | 28.2 | 4.2 | 2.3 | 94.0 | Re = La | 1.0 | L | 5.0 |
| 31* | 35.2 | 24.4 | 5.7 | 28.2 | 4.2 | 2.3 | 92.5 | Re = Ce | 2.5 | M | 5.0 |
| 32* | 35.2 | 24.4 | 5.7 | 28.2 | 4.2 | 2.3 | 93.5 | Re = Nd | 1.5 | N | 5.0 |

TABLE 2

| | Composition of Vitreous component (mol %) | | | | | | | | | |
|---|---|---|---|---|---|---|---|---|---|---|
| Ref. | Li₂O | BaO | MgO | CaO | SrO | SiO₂ | MnO₂ | TiO₂ | CuO | Al₂O₃ |
| A | 27 | 6 | 0 | 5 | 5 | 45 | 3 | 4 | 3 | 2 |
| B | 27 | 6 | 0 | 0 | 5 | 47 | 2 | 3 | 2 | 8 |
| C | 27 | 4 | 3 | 4 | 4 | 44 | 3 | 4 | 3 | 4 |
| D* | 9 | 7 | 2 | 7 | 7 | 54 | 1 | 6 | 2 | 5 |
| E* | 46 | 4 | 1 | 4 | 4 | 30 | 2 | 3 | 3 | 3 |
| F* | 30 | 0 | 0 | 0 | 4 | 55 | 2 | 3 | 3 | 3 |
| G* | 15 | 10 | 10 | 10 | 15 | 34 | 1 | 2 | 1 | 2 |
| H* | 42 | 4 | 6 | 6 | 6 | 25 | 1 | 3 | 3 | 4 |
| I* | 15 | 2 | 0 | 0 | 4 | 65 | 3 | 4 | 3 | 4 |
| J* | 32 | 5 | 5 | 6 | 6 | 13 | 12 | 14 | 3 | 4 |
| K* | 39 | 7 | 2 | 7 | 7 | 34 | 0 | 0 | 1 | 3 |
| L* | 30 | 8 | 2 | 8 | 8 | 32 | 1 | 6 | 0 | 5 |
| M* | 28 | 6 | 3 | 6 | 6 | 42 | 2 | 4 | 3 | 0 |
| N* | 24 | 5 | 3 | 5 | 5 | 41 | 1 | 2 | 2 | 12 |

TABLE 3

| No. | Firing temp (°C.) | $\epsilon$ | tan $\delta$ (%) | Third harmonic 100 Vrms/mm | Distortion (dB) 200 Vrms/mm | TCR of C (%) |
|---|---|---|---|---|---|---|
| 1 | 1140 | 1410 | 0.35 | −88 | −76 | −10 |
| 2 | 1160 | 1280 | 0.28 | −94 | −83 | −8 |

TABLE 3-continued

| No. | Firing temp (°C.) | ε | tan δ (%) | Third harmonic 100 Vrms/mm | Distortion (dB) 200 Vrms/mm | TCR of C (%) |
|---|---|---|---|---|---|---|
| 3 | 1120 | 1240 | 0.25 | −92 | −81 | −11 |
| 4 | 1160 | 1470 | 0.36 | −84 | −75 | −11 |
| 5 | 1140 | 1360 | 0.32 | −88 | −79 | −12 |
| 6* | 960 | 1950 | 2.73 | −55 | −48 | −20 |
| 7* | 1140 | 320 | 0.48 | −92 | −78 | −30 |
| 8* | 1080 | 240 | 0.27 | −96 | −81 | −22 |
| 9* | 940 | 2320 | 3.20 | −52 | −46 | −21 |
| 10* | 1140 | 1610 | 1.77 | −79 | −70 | −17 |
| 11* | 1120 | 420 | 0.35 | −85 | −73 | −25 |
| 12* | 1180 | 450 | 0.80 | −87 | −76 | −24 |
| 13* | 980 | 1470 | 2.12 | −79 | −69 | −12 |
| 14* | 1140 | 440 | 1.46 | −81 | −70 | −13 |
| 15* | 1120 | 1000 | 1.61 | −82 | −74 | −8 |
| 16* | 1100 | 1820 | 1.85 | −57 | −50 | −26 |
| 17* | 1160 | 1010 | 2.21 | −84 | −74 | −14 |
| 18* | 1080 | 2020 | 1.86 | −62 | −53 | −18 |
| 19* | 1120 | 430 | 1.48 | −86 | −75 | −23 |
| 20* | 1240 | 1700 | 0.43 | −84 | −71 | −9 |
| 21* | 940 | 380 | 0.88 | −77 | −69 | −14 |
| 22* | 1220 | 1830 | 0.52 | −83 | −74 | −12 |
| 23* | 1040 | 570 | 1.73 | −85 | −75 | −11 |
| 24* | 1220 | 1660 | 0.61 | −86 | −76 | −13 |
| 25* | 1220 | 1580 | 0.52 | −87 | −76 | −13 |
| 26* | 1240 | 1720 | 0.48 | −85 | −76 | −12 |
| 27* | 1200 | 1380 | 0.62 | −86 | −75 | −14 |
| 28* | 1240 | 1420 | 0.55 | −85 | −76 | −13 |
| 29* | 1220 | 1030 | 0.38 | −87 | −77 | −10 |
| 30* | 1160 | 1100 | 1.71 | −86 | −76 | −16 |
| 31* | 1220 | 1080 | 0.67 | −84 | −68 | −13 |
| 32* | 1240 | 1050 | 0.42 | −82 | −74 | −14 |

As will be understood from the above results, the dielectric ceramic composition according to the present invention has a high dielectric constant of not less than 000, a dielectric loss factor of not more than 0.5% at 1 KHz, a low distortion factor and a small change rate of capacitance on temperature. In addition, it is possible to fire it at a relatively lower temperature of not more than 200° C.

The main composition has been limited to those having a compositional proportions defined as above for the following reasons: If the content of $SrTiO_3$ is less than 20.0 wt %, the dielectric loss factor becomes larger than 0.5%, and the distortion factor becomes large (specimen No. 6). If the content of $SrTiO_3$ exceeds 50.0 wt %, the relative dielectric constant becomes less than 500, and the temperature change rate of dielectric constant becomes large (specimen No. 7).

If the content of $PbTiO_3$ is less than 8.0 wt %, the relative dielectric constant becomes less than 500 (specimen No. 8). If the content of $PbTiO_3$ exceeds 37.6 wt %, the dielectric loss factor becomes larger than 0.5%, and the distortion factor becomes large (specimen No. 9).

If the content of $CaTiO_3$ is less than 3.2 wt %, the dielectric loss factor becomes larger than 0.5% (specimen No. 10). If the content of $CaTiO_3$ exceeds 33.9 wt %, the relative dielectric constant becomes less than 500 (specimen No. 11).

If the content of $Bi_2O_3$ is less than 4.4 wt %, the relative dielectric constant becomes less than 500 (specimen No. 12). If the content of $Bi_2O_3$ exceeds 35.2 wt %, the dielectric loss factor becomes larger than 0.5% (specimen No. 13).

If the content of $TiO_2$ is less than 2.5 wt %, the relative dielectric constant becomes less than 500 (specimen No. 14). If the content of $TiO_2$ exceeds 13.6 wt %, the dielectric loss factor becomes larger than 0.5% (specimen No. 15).

If the content of $SnO_2$ is less than 0.2 wt %, the dielectric loss factor becomes larger than 0.5%, and the distortion factor becomes large (specimen No. 16). If the content of $SnO_2$ exceeds 12.0 wt %, the dielectric loss factor becomes greater than 0.5% (specimen No. 17).

The dielectric ceramic composition of the present invention has been limited to those containing 0.1 to 5.0 wt % of at least one oxide of rare earth elements, and 0.2 to 15 wt % of the glass component incorporated in the main component for the following reasons:

If the added amount of rare element oxide ($Re_2O_3$) is less than 0.1 wt %, the dielectric loss factor becomes larger than 0.5% (specimen No. 18). If the content of rare earth element oxide exceeds 5.0 wt %, the relative dielectric constant becomes less than 500 (specimen No. 19).

The added amount of glass component has been limited a value from 0.2 to 15.0 wt % for the following reasons. If the added amount of the glass component is less than 0.23 wt %, the sintering temperature becomes higher than 1300° C. (specimen No. 20). If the added amount of the glass component exceeds 15.0 wt %, the ceramics becomes porous and the dielectric constant becomes less than 500 (specimen No. 21).

The glass component incorporated into the main component has been limited to those having a composition defined as above for the following reasons.

If the content of $Li_2O$ in the glass component is less than 10 mol %, the sintering temperature becomes high (specimen No. 22). If the content of $Li_2O$ exceeds 45 mol %, the melting point of the glass component becomes lower than 800° C., thus making impossible to use it as a sintering auxiliary agent. In addition, the dielectric loss factor becomes more than 0.5% (specimen No.23).

If the content of at least one oxide of BaO, MgO, CaO and SrO is less than 5 mol % or exceeds 40 mol %, the sintering temperature becomes higher than 1200° C. (specimens No. 24 or 25).

If the sum of the content of $SiO_2$ and that of at least one oxide of $TiO_2$ and $MnO_2$ is less than 30 mol % or exceeds 70 mol %, or if the sole content of $SiO_2$ is less than 15 mol %, or if none of $TiO_2$ and/or $MnO_2$ is incorporated in the glass component, the sintering temperature becomes higher than 1200° C. (specimens No. 26, 27, 28 and 28).

Copper oxide CuO incorporated into the glass component contributes to reduce the dielectric loss and temperature characteristics of the product. If the content of CuO is less than 1 mol %, the dielectric loss factor becomes more than 0.5% (specimen No. 30). If the content of CuO exceeds 35 mol %, the insulating resistance becomes considerably lowered.

If the content of alumina ($Al_2O_3$) in the glass component is less than 0.2 mol %, or if its content exceeds 10 mol %, the sintering temperature becomes higher than 1200° C. Thus, the content of $Al_2O_3$ in the glass component has been limited to from 0.2 mol % to 10 mol %.

What is claimed is:

1. A dielectric ceramic composition consisting essentially of 80 to 99.7 wt % of a main component of a system $SrTiO_3$-$PbTiO_3$-$CaTiO_3$-$Bi_2O_3$-$TiO_2$-$SnO_2$, 0.1 to 5.0 wt % of at least one oxide of rare earth elements in terms of $Re_2O_3$, where Re is at least one rare earth element selected from the group consisting of Nd, La, Ce, Pr and Sm, and 0.2 to 15 wt % of a vitreous component, said main component consisting essentially, by weight, of 20.0 to 50.0% of $SrTiO_3$, 8.0 to 37.6% of $Pb$-$TiO_3$, 3.2 to 33.9% of $CaTiO_3$, 4.4 to 35.2% of $Bi_2O_3$, 2.5 to 13.6% of $TiO_2$, and 0.2 to 12.0% of $SnO_2$.

said vitreous component consisting essentially of 10 to 45 mol % of $Li_2O$, 5 to 40 mol % of at least one oxide selected from the group consisting of BaO, MgO, CaO and SrO, 0.2 to 10 mol % of $Al_2O_3$, 30 to 70 mol % of at least two oxides selected from the group consisting of $SiO_2$, $MnO_2$ and $TiO_2$, and 1 to 35 mol % of CuO, the content of $SiO_2$ in the vitreous component being not less than 15 mol % at the least.

* * * * *